United States Patent
Miyajima et al.

(10) Patent No.: US 8,150,594 B2
(45) Date of Patent: Apr. 3, 2012

(54) DRIVING SUPPORT DEVICE, DRIVING SUPPORT METHOD, AND DRIVING SUPPORT PROGRAM

(75) Inventors: Takayuki Miyajima, Anjo Aichi (JP); Fumiharu Ogawa, Okazaki Aichi (JP); Atsushi Takeuchi, Nagoya Aichi (JP); Masaki Maruyama, Kariya Aichi (JP); Hiroyuki Kodama, Kariya Aichi (JP); Hideaki Koto, Kariya Aichi (JP)

(73) Assignee: Aisin AW Co., Ltd. (JP)

( * ) Notice: Subject to any disclaimer, the term of this patent is extended or adjusted under 35 U.S.C. 154(b) by 500 days.

(21) Appl. No.: 12/401,328

(22) Filed: Mar. 10, 2009

(65) Prior Publication Data

US 2009/0240413 A1    Sep. 24, 2009

(30) Foreign Application Priority Data

Mar. 21, 2008   (JP) ................................ 2008-072822

(51) Int. Cl.
   *B60T 8/17*    (2006.01)
(52) U.S. Cl. .............................. 701/96; 701/70; 701/79
(58) Field of Classification Search ................ 701/79, 701/70, 96
   See application file for complete search history.

(56) References Cited

U.S. PATENT DOCUMENTS

| 5,189,621 | A | 2/1993 | Onari et al. ............. 364/431.04 |
| 5,521,823 | A | 5/1996 | Akita et al. ............. 364/424.05 |
| 6,076,034 | A | 6/2000 | Satoh et al. .................... 701/70 |
| 6,095,945 | A | 8/2000 | Graf ................................ 477/97 |
| 7,792,624 | B2 * | 9/2010 | Nakamura et al. ............. 701/72 |
| 2006/0290202 | A1 * | 12/2006 | Shibata et al. ................ 303/165 |
| 2007/0208485 | A1 | 9/2007 | Yamamura et al. ............ 701/93 |
| 2011/0046827 | A1 * | 2/2011 | Yoon et al. .................... 701/20 |

FOREIGN PATENT DOCUMENTS

| JP | 11-222-055 | 8/1999 |
| JP | 2004-116637 | 4/2004 |
| JP | 2006-137235 | 6/2006 |
| JP | 2006-327267 | 12/2006 |
| JP | 2007-210592 | 8/2007 |

* cited by examiner

*Primary Examiner* — Paul N Dickson
*Assistant Examiner* — Nicole Verley
(74) *Attorney, Agent, or Firm* — Bacon and Thomas, PLLC (57) ABSTRACT

A target vehicle speed at a predetermined position ahead of a host vehicle is obtained, and a plurality of deceleration patterns with different deceleration schemes is obtained for decelerating the host vehicle to the target vehicle speed. Based on a driving operation for controlling speed of the host vehicle, a deceleration pattern is selected from the plurality of deceleration patterns. Using the selected deceleration pattern as a reference, the vehicle speed of the host vehicle is reduced to the target vehicle speed before the host vehicle reaches the predetermined position.

9 Claims, 5 Drawing Sheets

DRIVING SUPPORT DEVICE, DRIVING SUPPORT METHOD, AND DRIVING SUPPORT PROGRAM

INCORPORATION BY REFERENCE

The disclosure of Japanese Patent Application No. 2008-072822 filed on Mar. 21, 2008 including the specification, drawings and abstract is incorporated herein by reference in its entirety.

BACKGROUND OF THE INVENTION

1. Field of the Invention

The present invention relates to a driving support device, a driving support method, and a computer-readable medium having, encoded thereon, a driving support program which perform a control that assists the driving of a vehicle.

2. Description of the Related Art

Systems for controlling speed of a vehicle using road information provided by a navigation device are known. Japanese Patent Application Publication No. JP-A-2004-116637 describes a control system that judges whether speed reduction control should be performed from a point in advance of a distance that is determined depending on the shape of a curve section ahead. If it is judged that a required speed is equal to or greater than a predetermined value, then the speed reduction control is initiated when the driver stops depressing the accelerator pedal, which is interpreted as a signal of the driver's intent to decelerate.

SUMMARY OF THE INVENTION

However, the related art is incapable of both decelerating the vehicle up to a certain target point where deceleration should be completed and reflecting the driver's intent regarding the speed reduction control. For example, in Japanese Patent Application Publication No. JP-A-2004-116637, the speed reduction control cannot be carried out when the accelerator pedal is depressed. However, when the vehicle is about to enter a curve at an excessive speed, forcibly controlling speed reduction may be desirable even if the acceleration pedal is depressed, i.e. automatic control overrides manual control.

Accordingly, it is an object of the present invention to provide a system (device) that ensures deceleration to a target vehicle speed while also reflecting the driver's intent.

In order to achieve the above object, the present invention employs a plurality of deceleration patterns with different deceleration rates (rate schemes) for decelerating the host vehicle to the target vehicle speed. Based on a driving operation for controlling a vehicle speed of the host vehicle, a deceleration pattern is selected from among the plurality of deceleration patterns. Using the selected deceleration pattern as a reference, the vehicle speed of the host vehicle is reduced to the target vehicle speed before the host vehicle reaches the predetermined position. The timing and nature of the driving operation while the vehicle travels toward a predetermined position naturally differs depending on the driver, and may also occasionally differ for whatever reason when the same driver drives the vehicle toward the same point. According to the present invention, while a vehicle travels toward a predetermined position a deceleration pattern pre-associated with a particular driving operation can be selected from a plurality of deceleration patterns based on the particular driving operation performed by the driver, and a speed reduction control is executed using the selected deceleration pattern as a reference. Each deceleration pattern is estimated from the mode of the driving operation and is specified in advance in order to reflect the driver's intent. Therefore, the vehicle can be reliably decelerated to the target vehicle speed while also reflecting the driver's will to the extent possible.

The target vehicle speed obtaining unit is not limited provided it is capable of obtaining the target vehicle speed at a predetermined position ahead of the host vehicle. Thus, the vehicle speed obtaining unit identifies the current location of the host vehicle and obtains the target vehicle speed at a predetermined position ahead of the current location. The current location of the host vehicle may be determined using a sensor, a camera, a signal from a GPS receiver, a host vehicle path on a map, vehicle-to-vehicle communication, road-to-vehicle communication, or the like. Here, the predetermined position is any target point for the completion of deceleration by a certain sequence of speed reduction controls. For example, the predetermined position may be an entrance to a curve, or a point where the posted speed limit changes to a lower speed, an intersection with a signal where the timing of stopping is predictable, a stop-sign intersection, or the like. The target vehicle speed may be a preset speed associated with the predetermined position (such as a road speed limit), or may be calculated based on the shape of the road. For example, if the predetermined position is the entrance to a curve, then the target vehicle speed at the predetermined position may be calculated based on the shape of the curve (e.g. a blind curve, a series of curves, a gradient) such that the lateral acceleration when traveling through the curve reaches a predetermined value. The calculation of the target vehicle speed may also take into consideration the road friction coefficient, vehicle weight, road congestion, and/or the like.

The deceleration pattern obtaining unit likewise is not limited, provided that it is capable of obtaining a plurality of deceleration patterns with different deceleration schemes, wherein the deceleration pattern is a pattern used as a reference in controlling deceleration of the host vehicle to the target vehicle speed in order to travel through the predetermined position at the target vehicle speed. Here, the deceleration pattern is not limited, provided that it specifies a deceleration behavior for decelerating the host vehicle to the target vehicle speed. The deceleration pattern may specify a rate of deceleration, or an accumulation of reference vehicle speeds at respective positions up to a predetermined position. Alternatively, the deceleration pattern may be specified as an accumulation of reference vehicle speeds at respective times until the predetermined position is reached.

The deceleration pattern selecting unit selects a deceleration pattern from among the plurality of deceleration patterns, based on a driving operation performed in order to control the vehicle speed of the host vehicle. The driving operation for controlling the vehicle speed may be, for example acceleration, maintaining the same vehicle speed or deceleration. Other examples of driving operations include: maintaining the depressed state of the accelerator pedal, changing the amount that the accelerator pedal is depressed, releasing the accelerator pedal, changing the amount the brake pedal is depressed, and changing the shift ratio. The deceleration pattern selecting unit selects a deceleration pattern with a higher rate of deceleration when a driving operation for faster acceleration is performed. This allows the deceleration control unit to delay the time at which the speed reduction control intervenes and to reliably achieve deceleration to the target vehicle speed, in order to reflect the driver's intent to accelerate to the extent possible.

The deceleration control unit is not limited provided that it is capable of using the selected deceleration pattern as a reference to reduce the speed of the host vehicle to the target vehicle speed before reaching the predetermined position. The speed reduction control using a deceleration pattern as a reference involves at least usage as a timing criterion for when to initiate the speed reduction control. For example, the speed reduction control may be initiated when a deceleration required for decelerating the vehicle speed of the host vehicle at a current location to a target speed at a predetermined position exceeds a deceleration specified by the deceleration pattern used as a reference. After the speed reduction control is initiated, the host vehicle may be controlled so as to decelerate in a manner of the selected deceleration pattern. Alternatively, a required deceleration may be calculated from the vehicle speed when the speed reduction control is initiated, the target vehicle speed and the distance to the predetermined position, whereby the vehicle speed is reduced with the required deceleration. The speed reduction control may control the throttle opening, an automatic transmission, a brake, or the like.

In the present invention, the deceleration pattern selecting unit may select a deceleration pattern with a higher deceleration rate (larger absolute value) when the accelerator pedal is operated as compared to that selected when the accelerator pedal is not operated. This allows the deceleration control unit to delay the timing at which the speed reduction control intervenes and reliably achieve deceleration to the target vehicle speed, in order to reflect the driver's intent, as expressed by depressing the accelerator pedal, to the extent possible. Selecting a deceleration pattern with a higher rate of deceleration makes it possible to delay the timing at which the deceleration of the selected deceleration pattern is exceeded by the deceleration required to reduce the vehicle speed from that at the current location of the host vehicle to the target vehicle speed at the predetermined position. Delaying the timing at which the control intervenes means that a vehicle speed exceeding that of the deceleration pattern used as a reference is decelerated in a manner that resembles the deceleration pattern. As a consequence, deceleration can be achieved such that the target vehicle speed is reached at the predetermined position.

On the other hand, a deceleration pattern selected when there is no operation of the accelerator pedal has a more gradual degree of deceleration as compared to that selected when the accelerator pedal is operated. When the accelerator pedal is not depressed, an intent to decelerate (or at least the absence of an intent to accelerate) can be assumed. Accordingly, the deceleration control can be initiated at a faster timing (earlier) as compared to a case wherein the accelerator pedal is depressed and a determination regarding the timing at which a control for gradual deceleration intervenes. In addition, deceleration can be performed in a manner approximating the deceleration pattern, with gradual deceleration such that deceleration to the target vehicle speed at the predetermined position is achieved.

In the present invention, the deceleration control unit refers to reference vehicle speed set at respective positions (locations) en route to the predetermined position, in accordance with the selected deceleration pattern, to determine whether the current vehicle speed of the host vehicle is faster than the reference vehicle speed at each of the respective positions. If the current vehicle speed is faster than the reference vehicle speed, then the speed reduction control is executed. Namely, the deceleration control unit compares whether the vehicle speed of the host vehicle exceeds the reference vehicle speed at each of the respective positions en route to the predetermined position, and initiates the speed reduction control once the reference vehicle speed is exceeded. After the speed reduction control is initiated, the host vehicle may be controlled so as to decelerate in the manner of the selected deceleration pattern. Alternatively, a required deceleration may be calculated from the vehicle speed when the speed reduction control is initiated, the target vehicle speed and the distance to the predetermined position, whereby the vehicle is controlled to slow with the required deceleration.

The method of the present invention includes obtaining a plurality of different deceleration patterns for decelerating a host vehicle to a target vehicle speed; selecting a deceleration pattern from among the plurality of deceleration patterns, based on detection of a driving operation for controlling a vehicle speed of the host vehicle; and decelerating the host vehicle using the selected deceleration pattern as a reference. The above-described driving support device, program, and method may be embodied in various forms, and the apparatus may be an individual (stand alone) device or may share components in common with another device or devices provided in the vehicle. Furthermore, modifications can be made as appropriate such as using software for a portion and/or using hardware for a portion. The present invention may also be embodied in the form of a computer-readable medium encoded with a program for controlling a computer to function as the previously described apparatus ("system" or "device"). The recording medium of such software may be a magnetic recording medium, a magneto-optic recording medium, or any recording medium to be developed in the future.

DETAILED DESCRIPTION OF THE PREFERRED EMBODIMENTS

Figure 1:
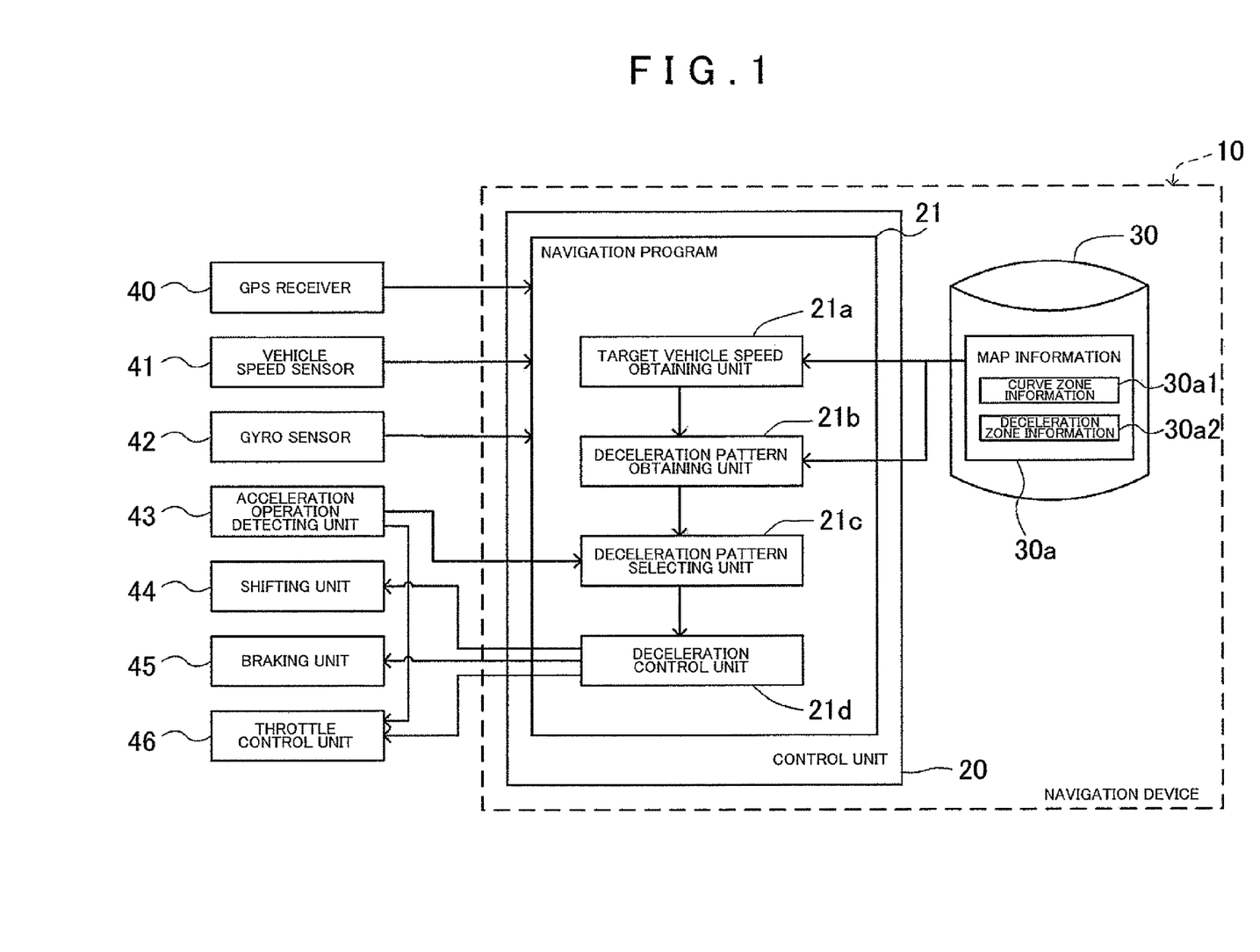
FIG. 1 is a block diagram of a navigation device of the present invention.

Hereinafter, embodiments of the present invention will be described in the following order.
(1) Navigation Device Structure
(2) Driving Support Processing
(3) Other Embodiments (1) Navigation Device Structure FIG. 1 is a block diagram showing the structure of a navigation device (apparatus) 10 incorporating a driving support device according to the present invention. The navigation device 10 includes a control unit 20 that has a CPU, a RAM, a ROM, and the like, and a memory medium 30. The navigation device 10 executes programs stored in the memory medium 30 and the ROM using the control unit 20. In the present embodiment, one such executable program is a navigation program 21, wherein the navigation program 21 functions to decelerate a host vehicle to reach a target vehicle speed at a predetermined position ahead of the host vehicle.

In order for the apparatus to realize functions in accordance with the navigation program 21, the host vehicle (a vehicle in which the navigation device 10 is installed) is provided with a GPS receiver 40, a vehicle speed sensor 41, a gyro sensor 42, an accelerator operation detecting unit 43, a shifting unit 44, a braking unit 45, and a throttle control unit 46. The functions of the navigation program 21 are realized by these units operated under control of the control unit 20.

The GPS receiver 40 receives radio signals from a GPS satellite and outputs a signal for calculating the current location of the host vehicle via an interface (not shown). The control unit 20 receives the signal to obtain the current location of the host vehicle. The vehicle speed sensor 41 outputs a signal that corresponds to the rotational speed of a wheel of the host vehicle. The control unit 20 obtains this signal via an interface (not shown) to obtain the speed of the host vehicle. The gyro sensor 42 detects an angular acceleration when the host vehicle turns within a horizontal plane and outputs a signal that corresponds to the orientation of the host vehicle. The control unit 20 obtains this signal via an interface (not shown) to obtain the travel direction of the host vehicle. The vehicle speed sensor 41 and the gyro sensor 42 are utilized for correcting the current location of the host vehicle as identified from the output signal of the GPS receiver 40, and the like. In addition, the current location of the host vehicle is corrected as appropriate based on verification with map information 30a described later.

The accelerator operation detecting unit 43 is a position sensor that detects the position of the accelerator pedal. The accelerator operation detecting unit 43 outputs information that specifies the detected position of the accelerator pedal. The control unit 20 obtains this information and determines whether the accelerator pedal is in a depressed state or a released state.

The shifting unit 44 includes an automatic transmission that has a plurality of shift speeds, for example, and transfers the driving force from the engine to wheels of the host vehicle while changing the rotational speed in a shift ratio that corresponds to a selected shift speed. The control unit 20 outputs a control signal for changing the shift speed via an interface (not shown), and the shifting unit 44 responds to the control signal by changing the shift speed.

The braking unit 45 includes a device that controls the pressure of a wheel brake cylinder to adjust the deceleration rate realized by a brake operatively connected to the wheel of the host vehicle. The control unit 20 outputs a control signal to the braking unit 45 whereby the pressure of the wheel cylinder can be adjusted. Accordingly, the control signal output to the braking unit 45 by the control unit 20 increases the pressure of the wheel cylinder, which increases a braking force generated by the brake and decelerates the host vehicle.

The throttle control unit 46 includes a device that controls a throttle valve to adjust the amount of air supplied to the engine of the host vehicle, and the throttle control unit 46 adjusts the opening of the throttle valve responsive to the position of the accelerator pedal as detected by the accelerator operation detecting unit 43. The throttle control unit 46 also receives a control signal from the control unit 20, and adjusts the opening of the throttle valve responsive to that control signal. Output of the control signal to the throttle control unit 46 from the control unit 20 increases the amount of intake air, which increases the rotational speed of the engine.

By executing the navigation program 21, the control unit 20 performs a route search for the vehicle based on output information from the GPS receiver 40 and map information described later, and also provides route guidance and the like via a display and/or a speaker (not shown). In order to realize a speed reduction control that decelerates the host vehicle to reach a target vehicle speed at a predetermined position ahead of the host vehicle, the navigation program 21 has a target vehicle speed obtaining unit 21a, a deceleration pattern obtaining unit 21b, a deceleration pattern selecting unit 21c, and a deceleration control unit 21d.

In addition, the memory medium 30 stores the map information 30a for carrying out the above-described functions performed by the programmed control unit 20. The map information 30a includes node data indicating nodes set on roads, shape interpolating data for identifying the shape of a road between nodes, link data indicating connections between nodes, and data indicating landmarks existing on or around a road. The map information 30a is used for identifying the current location of the host vehicle, providing a route search to a destination, providing route guidance to the destination, executing the speed reduction control, and the like.

Figure 2:
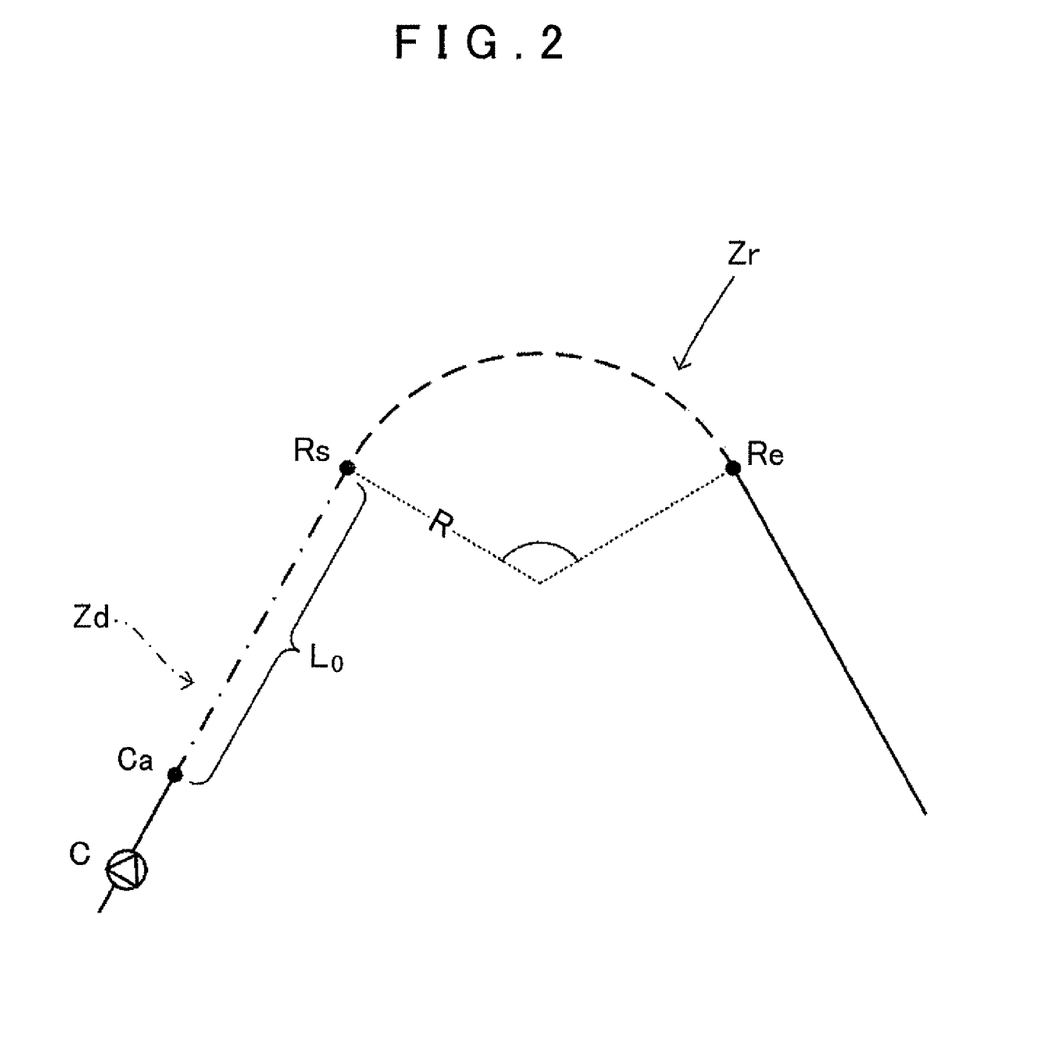
FIG. 2 is a schematic diagram of a curve zone and a deceleration zone.

The present embodiment executes the speed reduction control before the host vehicle reaches a curve (a section with a constant radius), and information indicating the curve (curve zone) and the road before and after the curve is included in the map information 30a. FIG. 2 shows an example of a curve zone Zr, and illustrates a situation where a host vehicle C is traveling toward the curve zone Zr, as indicated by a dashed line. According to the present embodiment, node data corresponding to a start point Rs of the curve zone Zr is associated with information indicating the start point Rs of the curve zone Zr, and node data corresponding to an end point Re of the curve zone Zr is associated with information indicating the end point Re of the curve zone Zr. Furthermore, shape interpolating data indicating the shape of the road between the start point Rs and the end point Re is data that indicates positions on the arc of the curve zone Zr. Based on the shape interpolating data, it is possible to identify a constant radius R of the curve zone Zr and a vehicle speed (a target vehicle speed Vreq) for traveling at a constant vehicle speed through a section with the radius R. For the present embodiment, information specifying the start point Rs and the end point Re of the curve zone Zr, as well as the shape interpolating data therebetween, is referred as curve zone information 30a1.

A section before the above-described curve zone Zr is set as a deceleration zone Zd (a section indicated by a dashed-dotted line in FIG. 2) for deceleration before reaching the curve zone Zr. In the present embodiment, node data corresponding to a start point Ca of the deceleration zone Zd is associated with information indicating the start point Ca of the deceleration zone Zd. Note that in the present embodiment, an end point of the deceleration zone Zd coincides with the start point Rs of the curve zone Zr, and the shape of the road between the start point Ca of the deceleration zone Zd and the start point Rs of the curve zone Zr is specified by shape interpolating data. Based on information specifying the positions of the start point Ca and the end point Rs of the deceleration zone Zd, it is possible to identify a distance $L_0$ of the deceleration zone Zd. For the present embodiment, information specifying the start point Ca and the end point Rs of the deceleration zone Zd, as well as the shape interpolating data indicating the shape of the road therebetween, is referred to as deceleration zone information 30a2.

The host vehicle speed obtaining unit 21a is a module that causes the control unit 20 to function to obtain a target vehicle speed at a predetermined position ahead of the host vehicle. Namely, the host vehicle speed obtaining unit 21a identifies the current location of the host vehicle and obtains the target vehicle speed at a location (position) a predetermined distance ahead of the current location. The deceleration pattern obtaining unit 21b is a module that causes the control unit 20 to obtain a plurality of deceleration patterns with different deceleration rates (rate schemes) (negative accelerations when the travel direction of the host vehicle is considered a positive direction), wherein the deceleration pattern is used as a reference for decelerating the host vehicle to a target vehicle speed in order to travel through the predetermined position at the target vehicle speed. Here, the deceleration pattern is not limited provided that it is capable of specifying deceleration action to decelerate the host vehicle to the target vehicle speed. According to the present embodiment, deceleration patterns correspond to two types of operating states regarding the accelerator pedal (described later) and two types of deceleration Go and Gf are obtained as deceleration patterns.

The deceleration pattern selecting unit 21c is a module that causes the control unit 20 to function to select a deceleration pattern from among the plurality of deceleration patterns, based on a driving operation made by the driver in order to control the speed of the host vehicle. A driving operation for controlling the vehicle speed may be any of various driving operations, such as acceleration, maintaining the same vehicle speed, deceleration, and the like. According to the present embodiment, depression of the accelerator pedal and release of the accelerator pedal are used as driving operations for controlling the vehicle speed as recited in the claims. In the present embodiment, a deceleration pattern with a greater degree of deceleration (larger absolute value) is selected when the accelerator pedal is operated as compared to that selected when the accelerator pedal is not operated.

The deceleration control unit 21d is a module that causes the control unit 20 to function to decelerate the host vehicle to the target vehicle speed using the selected deceleration pattern as a reference. The speed reduction control using a deceleration pattern as a reference at least provides a timing criterion for when to initiate the speed reduction control. In the present embodiment, reference vehicle speeds set at respective positions up to a predetermined location are specified by the selected deceleration pattern which is referenced to determine whether a current vehicle speed of the host vehicle is faster than the reference vehicle speed. If the current vehicle speed is faster than the reference vehicle speed, then the speed reduction control is executed. Following initiation of the speed reduction control, the selected deceleration pattern is referenced, for example, and deceleration is by feedback control such that the deceleration of the host vehicle approaches the selected deceleration pattern. As another example, a required deceleration may be calculated from the vehicle speed when the speed reduction control is initiated, and the target vehicle speed and the distance to a predetermined position, whereby the vehicle is controlled to decelerate based on the calculated required deceleration. The deceleration control unit 21d controls the shifting unit 44, the braking unit 45, the throttle control unit 46, and the like to reduce the vehicle speed.

(2) Driving Support Processing

Figure 3:
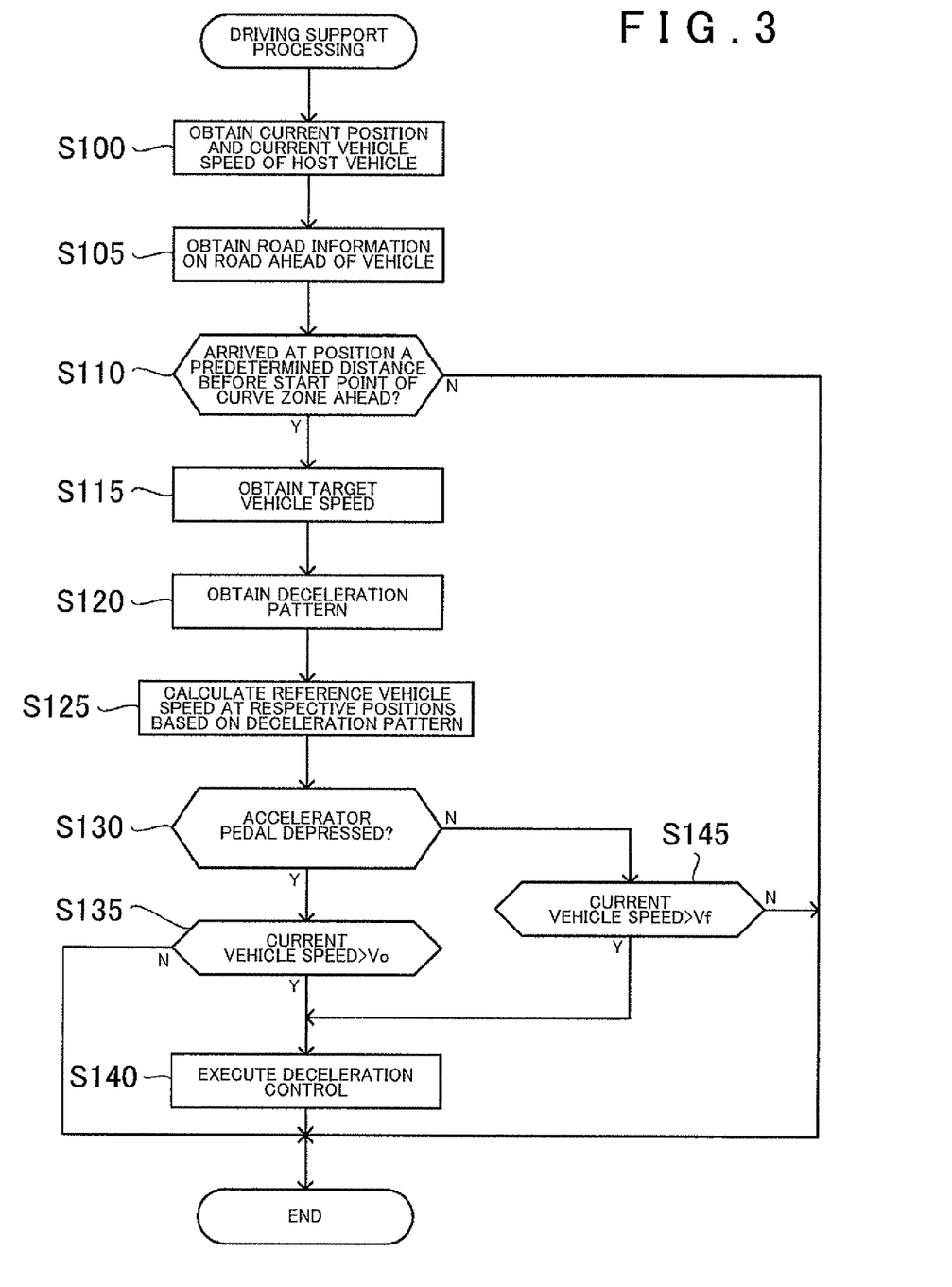
FIG. 3 is a flowchart of the driving support method of the present invention.

Next, driving support processing executed by the navigation device 10 having the above-described structure will be explained. When the navigation device 10 executes the navigation program 21, the processing shown in FIG. 3 is performed through the functions of the modules provided in the navigation program 21. The processing shown in FIG. 3 is repeatedly executed at a predetermined time interval by the control unit 20.

The control unit 20 first obtains the current location and a current vehicle speed Vc of the host vehicle through execution of processing by the target vehicle speed obtaining unit 21a (step S100), and then refers to the map information 30a to obtain road information for a predetermined range ahead of the current location of the host vehicle (step S105). Based on the obtained road information, the control unit 20 then determines whether the host vehicle has arrived at (passed through) the point Ca, which is the predetermined distance $L_0$ before the start point Rs of the curve zone Zr ahead of the host vehicle (step S110). In other words, the control unit 20 obtains the current location of the host vehicle based on the output signal of the GPS receiver 40 or the like, and refers to the road information to search for a curve zone within a predetermined distance ahead of the current location. If a curve zone is found within that predetermined distance, then the control unit 20 obtains the curve zone information 30a1 and the deceleration zone information 30a2 pertaining to the curve zone. The control unit 20 subsequently refers to the curve zone information 30a1 to obtain the location of the start point Rs of the curve zone Zr, and determines whether the current location of the host vehicle is within a predetermined distance $L_0$ in advance of the start point Rs. The current vehicle speed Vc is identified based on output from the vehicle speed sensor 41. Note that at step S110 it is determined whether the host vehicle has passed through the point Rs, and if the host vehicle has not yet arrived at the point Ca or has already passed through the point Rs, then the control unit 20 does not proceed to step S115 and ends the driving support processing. After passage of a predetermined amount of time, the processing is executed again starting from step S100.

During the period after it is determined at step S110 that the host vehicle has reached the point Ca (the start point of the deceleration zone Zd) until the host vehicle passes through the point Rs, the control unit 20 operates as the target vehicle speed obtaining unit 21a to obtain a target vehicle speed for travel through the curve zone Zr (step S115). More specifically, the control unit 20 refers to the curve zone information 30a1 to identify the radius R of the curve zone Zr, and obtains as the target vehicle speed Vreq a vehicle speed $(Gt \cdot R)^{1/2}$ for travel at a constant vehicle speed with a preset lateral acceleration Gt (e.g. 0.2 G) through a zone having the radius R.

Figure 4:
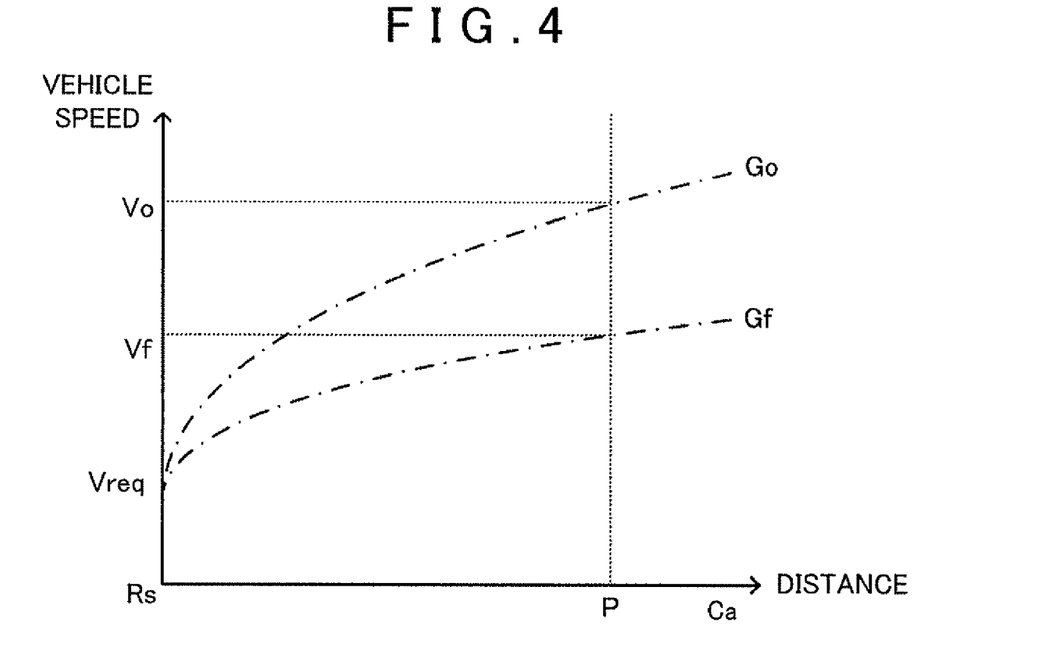
FIG. 4 is a graph of reference vehicle speeds at respective positions within the deceleration zone.

Operating as the deceleration pattern obtaining unit 21b, the control unit 20 next obtains a plurality of deceleration patterns with different deceleration rates and/or schemes for decelerating to the target vehicle speed (step S120). Based on the plurality of deceleration patterns, the control unit 20 respectively calculates reference vehicle speeds for positions including the current location of the host vehicle up to the start point Rs (step S125). More specifically, the control unit 20 obtains a deceleration Go (e.g. 0.2 G) that is a deceleration pattern selected when the accelerator pedal is depressed, and obtains a deceleration Gf (e.g. 0.1 G) that is a deceleration pattern selected when the accelerator pedal is released. Based on these deceleration patterns, i.e., the decelerations Go and Gf, the control unit 20 then calculates the reference vehicle speeds for respective positions in the deceleration zone Zd. FIG. 4 is a graph showing the reference vehicle speeds for respective positions in the deceleration zone Zd as calculated based on the decelerations Go and Gf. A reference vehicle speed corresponding to the deceleration Go at a current location P of the host vehicle is referred to as Vo, and a reference vehicle speed corresponding to the deceleration Gf at the current location is referred to as Vf.

Next, the control unit 20 operating as the deceleration pattern selecting unit 21c determines whether the accelerator pedal is depressed (step S130). If it is determined that the accelerator pedal is depressed, the control unit 20 then selects the deceleration Go and compares the current vehicle speed Vc with a reference vehicle speed Vo for the current location of the host vehicle (step S135). If it is determined at step S135 that the current vehicle speed Vc is greater than the reference vehicle speed Vo, then the control unit 20 executes the speed reduction control for decelerating the host vehicle to the target vehicle speed Vreq, using the deceleration Go as a reference, operating as the deceleration control unit 21d (step S140). More specifically, the control unit 20 decelerates the vehicle by controlling any of the shifting unit 44, the braking unit 45, and the throttle control unit 46, and by controlling feedback such that the actual vehicle speed approaches a reference vehicle speed at respective positions calculated based on the deceleration Go. If it is determined at step S135 that the current vehicle speed Vc is not greater than the reference vehicle speed Vo, then the speed reduction control is not yet initiated.

If it is determined at step S130 that the accelerator pedal is not depressed, then operating as the deceleration pattern selecting unit 21c, the control unit 20 selects the deceleration Gf and compares the current vehicle speed Vc with the reference vehicle speed Vf (step S145). If it is determined in step S145 that the current vehicle speed Vc is greater than the reference vehicle speed Vf, then the control unit 20 executes the speed reduction control for decelerating the host vehicle to the target vehicle speed Vreq, using the deceleration Gf as a reference, operating as the deceleration control unit 21d (step S140). More specifically, the control unit 20 decelerates the vehicle by controlling any of the shifting unit 44, the braking unit 45, and the throttle control unit 46, or the like, and by controlling feedback such that the actual vehicle speed approaches a reference vehicle speed at each of respective positions calculated based on the deceleration Gf. If it is determined at step S145 that the current vehicle speed Vc is not greater than the reference vehicle speed Vf, then the speed reduction control is not executed. In other words, the speed reduction control is executed so that there is no deceleration greater than the deceleration achieved by releasing the accelerator pedal (the deceleration achieved by air resistance, road friction resistance, engine braking, and the like).

Figure 5:
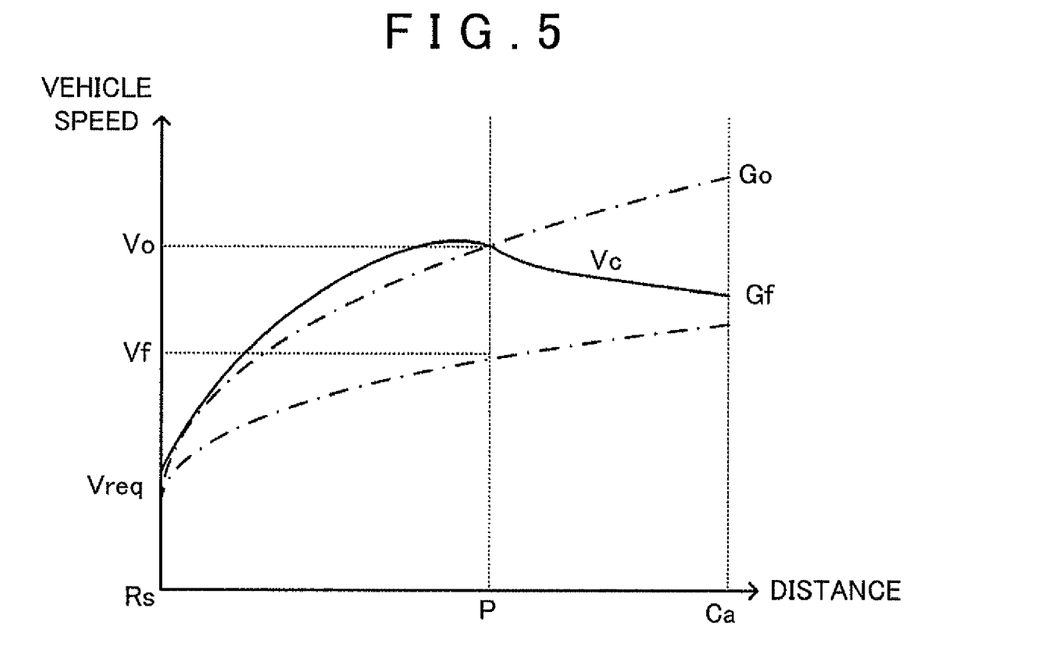
FIG. 5 is a graph of an example of vehicle speed versus distance (position) within the deceleration zone.

Examples of the timing at which the speed reduction control is performed by repeatedly executing the above-described driving support processing at predetermined time intervals will be explained next with reference to FIGS. 5 to 7. FIG. 5 shows an example of a shift in the current vehicle speed Vc when the host vehicle travels through the deceleration zone Zd with the accelerator pedal depressed and enters the curve zone Zr. Since the accelerator pedal is in a depressed state while traveling through the deceleration zone Zd, the deceleration Go is selected for determining the timing at which the speed reduction control is to be initiated. After passing through the point Ca but before reaching the point P, the current vehicle speed Vc is smaller than the reference vehicle speed Vo at the respective points, so the speed reduction control is not initiated. At the point P, the current vehicle speed Vc exceeds the reference vehicle speed Vo, so the speed reduction control is initiated after the point P, whereby the host vehicle is decelerated in a manner that resembles the deceleration pattern represented by the deceleration Go.

Figure 6:
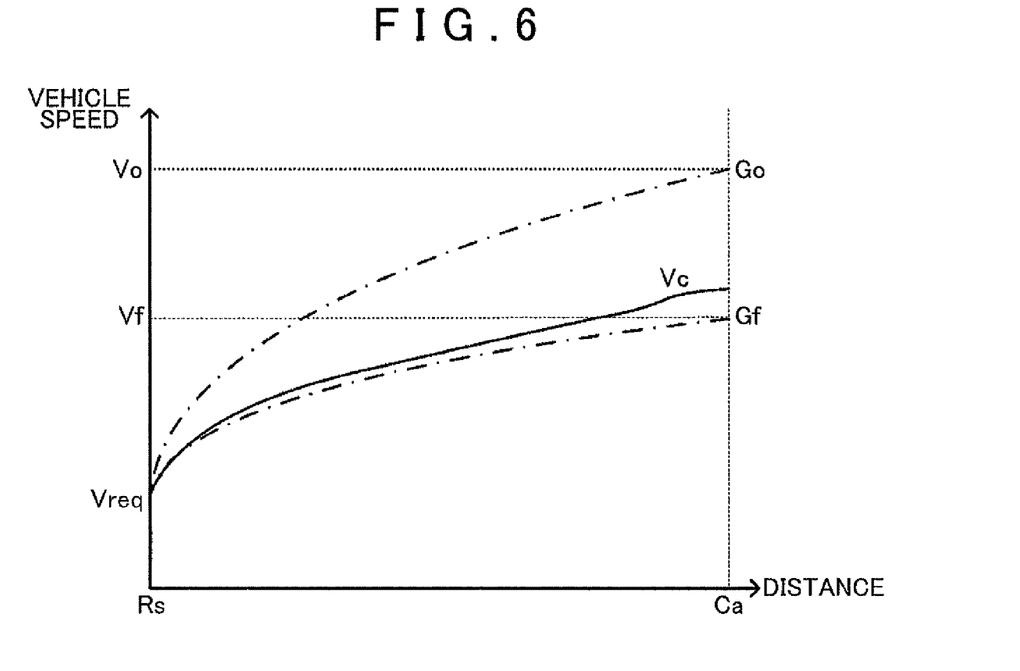
FIG. 6 is a graph of another example of vehicle speed versus distance (position) within the deceleration zone.

FIG. 6 shows an example of a shift in the current vehicle speed Vc when the host vehicle travels through the deceleration zone Zd with the accelerator pedal released and enters the curve zone Zr. Since the accelerator pedal is released while traveling through the deceleration zone Zd, the deceleration Gf is selected for determining the timing at which the speed reduction control is to be initiated. In the case of FIG. 6, the current vehicle speed Vc exceeds the reference vehicle speed Vf when the host vehicle passes through the point Ca, so the speed reduction control is immediately initiated, whereby the host vehicle is decelerated in a manner that resembles the deceleration pattern represented by the deceleration Gf.

Thus, in the present embodiment, a deceleration pattern with a higher rate of deceleration is selected when the accelerator pedal is operated compared to that selected when the accelerator pedal is not operated. Here, depression of the accelerator pedal is taken as signifying that the driver does not intend to decelerate. In such a case, the execution of a speed reduction control using a deceleration pattern identical to that used when the accelerator pedal is not depressed would not reflect the intent of the driver. Hence, by selecting a deceleration pattern depending on the operation of the accelerator pedal as described above in the present embodiment, even if the current vehicle speed Vc is approximately the same speed at the point Ca as shown in FIGS. 5 and 6, the timing at which the speed reduction control is initiated when the host vehicle travels through the deceleration zone Zd with the accelerator pedal depressed can be delayed relative to the timing adopted when the host vehicle travels through the deceleration zone Zd with the accelerator pedal released. Namely, in the case where the accelerator pedal is depressed, the driver's intent to accelerate expressed by depressing the accelerator pedal, can be respected to the extent possible. Delaying the timing at which the control intervenes means that a vehicle speed exceeding the reference vehicle speed based on the deceleration Go is decelerated so as to approach the deceleration Go. As a consequence, deceleration can be achieved such that the target vehicle speed Vreq is reached at the point Rs. In other words, deceleration to the target vehicle speed can be reliably achieved while also respecting the driver's intent.

On the other hand, a deceleration pattern selected when there is no operation of the accelerator pedal has a more gradual degree of deceleration compared to that selected when the accelerator pedal is operated. Therefore, even if the current vehicle speed Vc is approximately the same speed at the point Ca, the speed reduction control can be initiated at an earlier time (faster timing) than when the accelerator pedal is depressed. That is, the driver's intent to decelerate (or at least the absence of the driver's intent to accelerate), as expressed by releasing the accelerator pedal, can be estimated, and deceleration can be achieved in a manner that resembles the deceleration pattern of a gradual deceleration to reach a target vehicle speed at a predetermined position (the point Rs).

Figure 7:
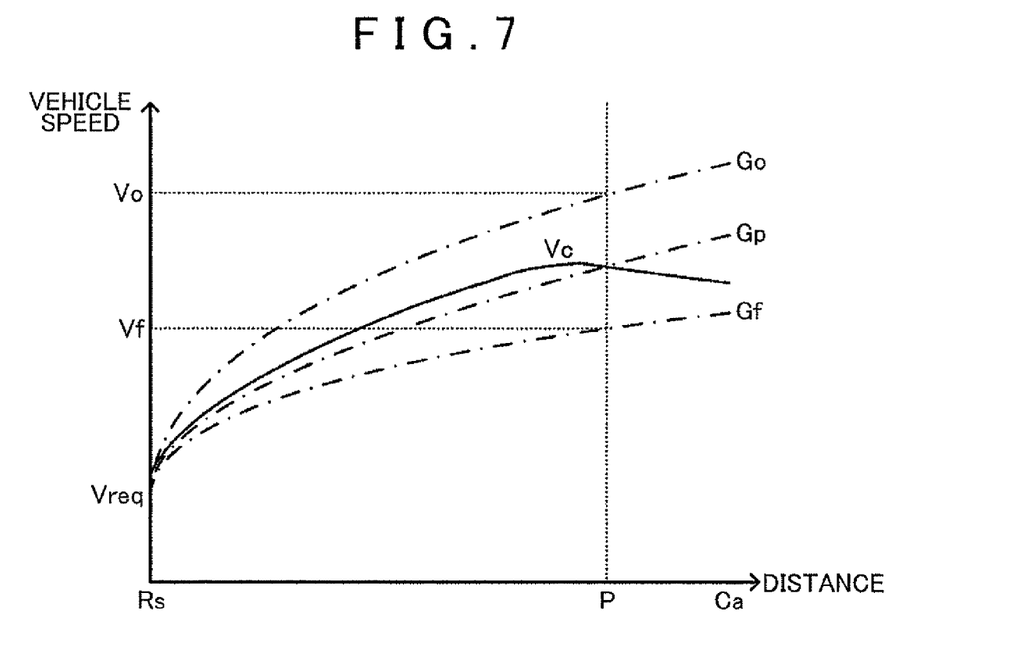
FIG. 7 is a graph of another example of vehicle speed versus distance (position) within the deceleration zone.

FIG. 7 shows an example of a shift in the current vehicle speed Vc when the accelerator pedal is depressed from the point Ca up to the point P, and then released at the point P. The accelerator pedal is in a depressed state from the point Ca up to the point P, and therefore the deceleration Go is selected for determining the timing of the start of the speed reduction control. However, the accelerator pedal is in a released state after the point P, and therefore the deceleration Gf is selected for determining the timing of the start of the speed reduction control. At the point P, the current vehicle speed Vc exceeds the reference vehicle speed Vf. As a consequence, the speed reduction control is executed once the point P is passed. Note that the speed reduction control in this case may decelerate the host vehicle in a manner that resembles the deceleration pattern illustrated by the deceleration Gf described above. However, as FIG. 7 shows, for example, a required deceleration Gp may be calculated from the distance from the point P to the point Rs, the current vehicle speed Vc and the target vehicle speed Vreq at the point P. And based on the deceleration Gp, reference vehicle speeds at respective positions from the point P to the point Rs may be additionally calculated, whereby the speed of the host vehicle is decelerated so as to approach the reference vehicle speed corresponding to the respective positions. Alternatively, a deceleration whose reference speed at the point P is closer to the current vehicle speed Vc at the point P may be selected among Go and Gf, and the host vehicle decelerated in a manner that resembles the deceleration pattern represented by the selected deceleration. As shown in FIG. 7, even if the driver's intent changes from acceleration to non-acceleration during travel through the deceleration zone, it is possible to ensure that the speed reduction control does not intervene against the driver's will unnecessarily while the indication is an intent to accelerate. Moreover, even if the driver's intent changes to non-acceleration and deceleration is required, the speed reduction control can be immediately initiated.

As described above, according to the present invention, when a vehicle travels toward a certain predetermined position a deceleration pattern pre-associated with a driving operation can be selected from a plurality of deceleration patterns based on the driving operation performed by the driver, and a speed reduction control can be executed that uses the selected deceleration pattern as a reference. The deceleration pattern pre-associated with the driving operation, as described above, is estimated from the driving operation and specified in advance in order to respect the driver's intent. Therefore, the vehicle can be reliably decelerated to the target vehicle speed while also respecting the driver's intent to the extent possible.

(3) Other Embodiments

The above embodiment is one example for carrying out the present invention. However, various other embodiments can be employed provided that a plurality of deceleration patterns with different deceleration schemes are obtained for decelerating a host vehicle to a target vehicle speed; based on a driving operation for controlling speed of the host vehicle, a deceleration pattern is selected from the plurality of deceleration patterns; and using the selected deceleration pattern as a reference, the host vehicle is decelerated.

For example, while the above-described embodiment uses the depression or non-depression of an accelerator pedal as the driving operation for controlling speed, the driving operation may be any of various other driving operations for acceleration, maintaining the same vehicle speed, and deceleration. For example, the present invention may be applied to driving operations such as a change in the amount the accelerator pedal is depressed, release of both the accelerator pedal and the brake pedal, a change in the amount the brake pedal is depressed, and a change of the shift ratio. In such cases, a braking operation detecting unit, a shifting operation detecting unit, or the like would be further included in the apparatus. The driver's intent to accelerate, maintain the same vehicle speed, or decelerate are estimated based on the amount the accelerator pedal is depressed, the amount the brake pedal is depressed, or the nature of a shift operation. A deceleration pattern with a greater degree of deceleration may then be selected when there is a stronger intent to accelerate. For example, depressing the accelerator pedal by a greater amount may be judged as a strong intent to accelerate, while depressing the brake pedal by a greater amount may be judged as a weak intent to accelerate. Consequently, if a driving operation for acceleration is performed, the timing at which the speed reduction control intervenes can be delayed in order to respect the intent indicated by the driving operation to the extent possible.

In the above embodiment, while the predetermined position is an entrance to a curve zone, any other target point for the completion of deceleration by a sequence of speed reduction controls may be the predetermined position. For example, a point where the posted road speed limit changes to a slower speed, an intersection with a signal where timing of stopping is predicted, a stop-sign intersection, or the like may be the predetermined position. The target vehicle speed may use a preset speed associated with the predetermined position (such as a posted road speed limit), or be calculated based on the shape of the road. As a specific example, if the predetermined position is the entrance to a curve zone, then the target vehicle speed at the predetermined position may be calculated based on the shape of the curve zone (e.g. a blind curve, a series of curves, or a gradient) such that a lateral acceleration when traveling through the curve zone reaches a predetermined value. Also, the calculation of the target vehicle speed may take into consideration the road friction coefficient, vehicle weight, road congestion, and/or the like.

Note that the determination to start the speed reduction control in the deceleration control unit need not be based on a comparison of the current vehicle speed with the reference vehicle speed. For example, the speed reduction control may be initiated when a deceleration required for decelerating the vehicle speed of the host vehicle at a current position to a target vehicle speed at a predetermined position exceeds a deceleration specified by a deceleration pattern used as a reference.

Further note that the deceleration pattern need not be specified as deceleration as in the above embodiment. Alternatively, the deceleration pattern may be specified as an accumulation of reference vehicle speeds at respective positions up to a predetermined position, or specified as an accumulation of reference vehicle speeds at respective times up until a predetermined position is reached. In addition, the deceleration pattern may be adjusted depending on shape, surface condition, gradient, traffic condition, or the like of the road before and after the predetermined position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support device comprising:
    a target vehicle speed obtaining unit that obtains a target vehicle speed at a predetermined position ahead of a host vehicle;
    a deceleration pattern obtaining unit that obtains a plurality of deceleration patterns with different deceleration schemes for decelerating the host vehicle to the target vehicle speed;
    a deceleration pattern selecting unit that selects a deceleration pattern from the plurality of deceleration patterns, based on a driving operation for controlling speed of the host vehicle; and
    a deceleration control unit that reduces the vehicle speed of the host vehicle to the target vehicle speed before the host vehicle reaches the predetermined position, in accordance with the selected deceleration pattern; and
    wherein the deceleration control unit refers to reference vehicle speeds respectively set for respective, spaced reference positions up to the predetermined position in the deceleration pattern to determine whether a current vehicle speed of the host vehicle is faster than the reference vehicle speed at a reference position; and if the current vehicle speed is faster than the reference vehicle speed at the reference position, then an automatic speed reduction control is executed.

2. The driving support device according to claim 1, wherein the deceleration pattern selecting unit selects a deceleration pattern with a higher rate of deceleration when an accelerator pedal is depressed as compared to that deceleration pattern selected when the accelerator pedal is not depressed.

3. A driving support method comprising the steps of:
obtaining a target vehicle speed at a predetermined position ahead of a host vehicle;
obtaining a plurality of deceleration patterns with different deceleration schemes for decelerating the host vehicle to the target vehicle speed;
selecting a deceleration pattern from the plurality of deceleration patterns, based on a driving operation for controlling speed of the host vehicle; and
reducing the vehicle speed of the host vehicle to the target vehicle speed before the host vehicle reaches the predetermined position in accordance with the selected deceleration pattern;
setting reference vehicle speeds for respective, plural, spaced reference positions up to the predetermined position in the deceleration pattern;
determining whether a current vehicle speed of the host vehicle is faster than the reference vehicle speed at each of the reference positions; and
if the current vehicle speed is faster than the reference vehicle speed at the reference position, executing an automatic speed reduction control.

4. The driving support method according to claim 3, wherein
a deceleration pattern with a higher rate of deceleration is selected when an accelerator pedal is depressed as compared to that deceleration pattern selected when the accelerator pedal is not depressed.

5. A non-transitory, computer-readable medium having, encoded thereon, a driving support program for causing a computer to perform the functions of:
obtaining a target vehicle speed at a predetermined position ahead of a host vehicle;
obtaining a plurality of deceleration patterns with different deceleration patterns, based on a driving operation for controlling speed of the host vehicle;
selecting a deceleration pattern from the plurality of deceleration patterns, based on a driving operation for controlling speed of the host vehicle;
reducing the vehicle speed of the host vehicle to the target vehicle speed before the host vehicle reaches the predetermined position in accordance with the selected deceleration pattern;
setting reference vehicle speeds for respective, plural, spaced reference positions up to the predetermined position in the deceleration pattern;
determining whether a current vehicle speed of the host vehicle is faster than the reference vehicle speed at each of the reference positions; and
if the current vehicle speed is faster than the reference vehicle speed at the reference position, executing an automatic speed reduction control.

6. The non-transitory, computer-readable medium according to claim 5, wherein
a deceleration pattern with a higher rate of deceleration is selected when an accelerator pedal is depressed as compared to that deceleration pattern selected when the accelerator pedal is not depressed.

7. A driving support device comprising:
a target vehicle speed obtaining unit that obtains a target vehicle speed at a predetermined position ahead of a host vehicle;
a deceleration pattern obtaining unit that obtains a plurality of deceleration patterns with different deceleration schemes for decelerating the host vehicle to the target vehicle speed;
a deceleration pattern selecting unit that selects a deceleration pattern from the plurality of deceleration patterns, based on a driving operation for controlling speed of the host vehicle; and
a deceleration control unit that reduces the vehicle speed of the host vehicle to the target vehicle speed before the host vehicle reaches the predetermined position, in accordance with the selected deceleration pattern; and
wherein the deceleration pattern selecting unit selects a deceleration pattern with a higher rate of deceleration when an accelerator pedal is depressed as compared to that deceleration pattern selected when the accelerator pedal is not depressed.

8. A driving support method comprising the steps of:
obtaining a target vehicle speed at a predetermined position ahead of a host vehicle;
obtaining a plurality of deceleration patterns with different deceleration schemes for decelerating the host vehicle to the target vehicle speed;
selecting a deceleration pattern from the plurality of deceleration patterns, based on a driving operation for controlling speed of the host vehicle; and
reducing the vehicle speed of the host vehicle to the target vehicle speed before the host vehicle reaches the predetermined position in accordance with the selected deceleration pattern; and
wherein a deceleration pattern with a higher rate of deceleration is selected when an accelerator pedal is depressed as compared to that deceleration pattern selected when the accelerator pedal is not depressed.

9. A non-transitory, computer-readable medium having, encoded thereon, a driving support program for causing a computer to perform the functions of:
obtaining a target vehicle speed at a predetermined position ahead of a host vehicle;
obtaining a plurality of deceleration patterns with different deceleration patterns, based on a driving operation for controlling speed of the host vehicle;
selecting a deceleration pattern from the plurality of deceleration patterns, based on a driving operation for controlling speed of the host vehicle;
reducing the vehicle speed of the host vehicle to the target vehicle speed before the host vehicle reaches the predetermined position in accordance with the selected deceleration pattern; and
wherein a deceleration pattern with a higher rate of deceleration is selected when an accelerator pedal is depressed as compared to that deceleration pattern selected when the accelerator pedal is not depressed.

* * * * *